United States Patent
Tokuchi

(10) Patent No.: US 11,006,017 B2
(45) Date of Patent: May 11, 2021

(54) INFORMATION PROCESSING DEVICE, INFORMATION PROCESSING METHOD, AND NON-TRANSITORY COMPUTER READABLE MEDIUM HAVING CONTROLLER FOR CONTROLLING NOTIFICATION OF EXECUTING LINKAGE FUNCTION

(71) Applicant: FUJI XEROX CO.,LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/019,557

(22) Filed: Jun. 27, 2018

(65) Prior Publication Data
US 2019/0082075 A1    Mar. 14, 2019

(30) Foreign Application Priority Data

Sep. 11, 2017    (JP) .............................. JP2017-174224

(51) Int. Cl.
*H04N 1/32* (2006.01)
*G06F 16/58* (2019.01)
*G06F 16/11* (2019.01)

(52) U.S. Cl.
CPC ....... *H04N 1/32128* (2013.01); *G06F 16/116* (2019.01); *G06F 16/58* (2019.01); *H04N 1/32112* (2013.01); *H04N 2201/0094* (2013.01); *H04N 2201/3247* (2013.01)

(58) Field of Classification Search
None
See application file for complete search history.

(56) References Cited

U.S. PATENT DOCUMENTS

| | | | | |
|---|---|---|---|---|
| 2006/0220982 | A1* | 10/2006 | Ueda ................... | H04N 21/472 345/1.1 |
| 2008/0049148 | A1* | 2/2008 | Hosoda .............. | H04N 1/32112 348/739 |
| 2009/0316204 | A1* | 12/2009 | Ogasawara .......... | G06F 3/1205 358/1.15 |
| 2010/0002096 | A1* | 1/2010 | Hong .................... | H04N 5/772 348/231.3 |
| 2011/0061066 | A1* | 3/2011 | Ogawa ................ | G06F 9/44521 719/328 |
| 2017/0039016 | A1* | 2/2017 | Sasaki ................ | H04N 1/32432 |

FOREIGN PATENT DOCUMENTS

| | | |
|---|---|---|
| JP | H10065830 | 3/1998 |
| JP | 3371007 | 1/2003 |
| JP | 2014016898 | 1/2014 |
| JP | 5692319 | 4/2015 |

* cited by examiner

*Primary Examiner* — Mohammad H Ghayour
*Assistant Examiner* — Pawan Dhingra
(74) *Attorney, Agent, or Firm* — JCIPRNET

(57) ABSTRACT

An information processing device includes a controller that controls a notification of a linkage function corresponding to plural selected files. In a further modification of the invention, the controller may control the notification of the linkage function corresponding to formats of the selected files. When the plural files having different formats are selected, the controller may control the notification of the linkage function corresponding to the formats of the selected files.

15 Claims, 14 Drawing Sheets

*FIG.2*

<LINKAGE FUNCTION MANAGEMENT TABLE>

| COMBINATION OF FILE FORMATS | LINKAGE FUCNTION |
|---|---|
| DOCUMENT FORMAT, TABLE FORMAT | • INSERT TABLE INTO DOCUMENT<br>• INSERT DOCUMENT INTO TABLE |
| DOCUMENT FORMAT, IMAGE FORMAT | • INSERT IMAGE INTO DOCUMENT<br>• SUPERIMPOSE DOCUMENT ON IMAGE |
| DOCUMENT FORMAT, VIDEO FORMAT | • INSERT VIDEO INTO DOCUMENT,<br>• INSERT STILL IMAGE INTO DOCUMENT |
| DOCUMENT FORMAT, DOCUMENT FORMAT | • INTEGRATE DOCUMENTS WITH EACH OTHER |
| TABLE FORMAT, TABLE FORMAT | • INTEGRATE TABLES WITH EACH OTHER |
| VIDEO FORMAT, VIDEO FORMAT | • INTEGRATE VIDEOS WITH EACH OTHER |
| SHEET FORMAT, DOCUMENT FORMAT | • INSERT DOCUMENT INTO PRESENTATION SHEET |
| ... | ... |

FIG.7

<LINKAGE FUNCTION MANAGEMENT TABLE>

| COMBINATION OF FILE FORMATS | SELECTING ORDER | LINKAGE FUNCTION+PRIORITY |
|---|---|---|
| DOCUMENT FORMAT, TABLE FORMAT | DOCUMENT→TABLE | ① INSERT DOCUMENT INTO TABLE<br>② INSERT TABLE INTO DOCUMENT |
| | TABLE→DOCUMENT | ① INSERT TABLE INTO DOCUMENT<br>② INSERT DOCUMENT INTO TABLE |
| DOCUMENT FORMAT, IMAGE FORMAT | DOCUMNET→IMAGE | ① SUPERIMPOSE DOCUMENT ON IMAGE<br>② INSERT IMAGE INTO DOCUMENT |
| | IMAGE→DOCUMENT | ① INSERT IMAGE INTO DOCUMENT<br>② SUPERIMPOSE DOCUMENT ON IMAGE |
| DOCUMENT FORMAT, VIDEO FORMAT | DOCUMNET→VIDEO | ① SUPERIMPOSE DOCUMENT ON VIDEO<br>② INSERT VIDEO INTO DOCUMENT |
| | VIDEO→DOCUMNET | ① INSERT VIDEO INTO DOCUMENT<br>② SUPERIMPOSE DOCUMENT ON VIDEO |
| ... | ... | ... |

INFORMATION PROCESSING DEVICE, INFORMATION PROCESSING METHOD, AND NON-TRANSITORY COMPUTER READABLE MEDIUM HAVING CONTROLLER FOR CONTROLLING NOTIFICATION OF EXECUTING LINKAGE FUNCTION

CROSS-REFERENCE TO RELATED APPLICATIONS

This application is based on and claims priority under 35 USC 119 from Japanese Patent Application No. 2017-174224 filed Sep. 11, 2017.

BACKGROUND

Technical Field

The present invention relates to an information processing device, an information processing method, and a non-transitory computer readable medium.

SUMMARY

According to an aspect of the invention, an information processing device includes a controller that controls a notification of a linkage function corresponding to plural selected files.

BRIEF DESCRIPTION OF THE DRAWINGS

Exemplary embodiments of the present invention will be described in detail based on the following figures, wherein:

FIG. 2 is a view illustrating an example of a linkage function management table;
FIG. 7 is a view illustrating an example of a linkage function management table according to Modification 1.

DETAILED DESCRIPTION

Figure 1:
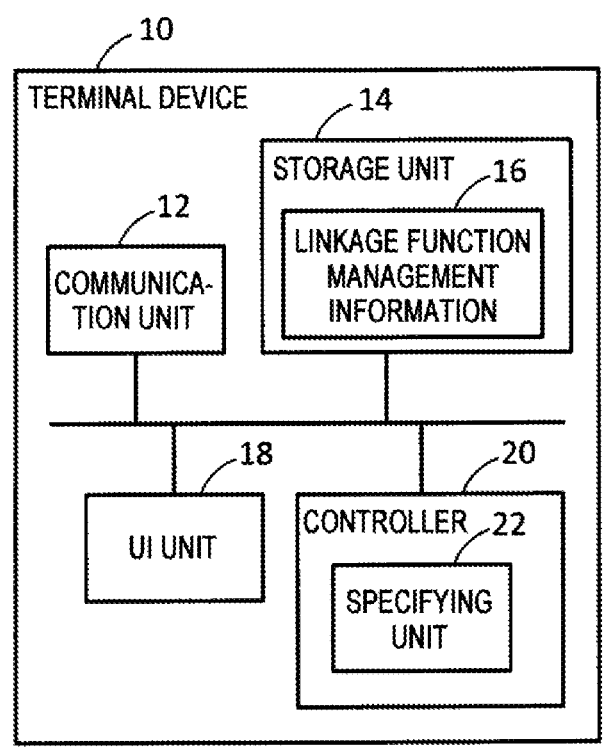
FIG. 1 is a block diagram illustrating a terminal device according to an exemplary embodiment of the invention.

Referring to FIG. 1, a terminal device which is an information processing device according to an exemplary embodiment of the invention will be described. FIG. 1 illustrates an example of the terminal device according to the present exemplary embodiment. A terminal device 10 is a device such as a personal computer (PC), a tablet PC, a smart phone, or a mobile phone. In addition, the terminal device 10 may be a wearable terminal (e.g., a wristwatch type terminal, a wristband type terminal, an eyeglass type terminal, a ring type terminal, a contact lens type terminal, an intracorporeal implanting type terminal, or a hearable terminal). Hereinafter, the configuration of the terminal device 10 will be described in detail.

A communication unit 12 is a communication interface and has a function of transmitting data to another device and a function of receiving data from another device. The communication unit 12 may be a communication interface having a wireless communication function or a communication interface having a wired communication function. For example, the communication unit 12 is compatible with one or plural types of communication methods and may communicate with a communication partner according to a communication method suitable for the communication partner (e.g., a communication method compatible with the communication partner). The communication method is, for example, an infrared communication, a visible light communication, a Wi-Fi (registered trademark) communication, or a proximity wireless communication (e.g., a near field communication (NFC)). As for the proximity wireless communication, for example, Felica (registered trademark), Bluetooth (registered trademark), or a radio frequency identifier (RFID) is used. In addition, another type of wireless communication may be used as the proximity wireless communication. The communication unit 12 may switch a communication method or a frequency band according to, for example, a communication partner or a surrounding environment.

A storage unit 14 is a storage device such as a hard disk or a memory (e.g., an SSD). The storage unit 14 stores, for example, linkage function management information 16, various types of files (data), various types of programs (e.g., an operating system (OS) and application software), and information indicating an address of another device. These pieces of information may be stored in separate storage devices or in a single storage device.

The linkage function management information 16 is information for managing a linkage function executable by linking plural functions to each other. One or plural linkage functions are implemented by linking plural functions to each other. The linkage function is a function implemented by linking plural pieces of software to each other. In addition, the linkage function may be a function implemented by linking a function that a device as hardware has and a function implemented by software to each other, or a function implemented by linking plural devices to each other. In addition, each device is, for example, an image forming device having an image forming function, a PC, a tablet PC, a smart phone, a mobile phone, a robot (e.g., a humanoid robot or an animal (other than human) type robot), a projector, a display device such as a liquid crystal display, a recording device, a playback device, an image capturing device such as a camera, a refrigerator, a rice cooker, a microwave oven, a coffee maker, a vacuum cleaner, a washing machine, an air conditioner, a lighting device, a watch, a surveillance camera, an automobile, a motorcycle, an aircraft (e.g., an unmanned aircraft (so-called, drone)), a game device, or various sensing devices (e.g., a temperature sensor, a humidity sensor, a voltage sensor, or a current sensor). Each device may be a device that outputs an output to a user (e.g., an image forming device or a PC) or a device that outputs no output to the user (e.g., a sensing device). In addition, all of plural devices executing a linkage function may output outputs to the user. Some of the devices may output outputs to the user, and the other devices may not output outputs to the user. All the devices may not output an output to the user. The concept of the devices may include all general kinds of devices. For example, the devices according to the present exemplary embodiment may also include an information device, a video device, an audio device, and other devices. In addition, when a device having plural output functions (a device that outputs an output to a user and that has plural output functions) and a sensing device which does not have an output function (a device that outputs no output to the user) are linked to each other, the linkage function management information 16 may include information indicating a combination of the specific sensing device and a specific one of the plural output functions. Accordingly, an output function to be used in combination with the specific sensing device is specified from among the plural output functions.

The linkage function will be described in more detail. The linkage function is a function to be executed on plural files (data) when the user selects the plural files. For example, each file is associated with software (application) for executing a process on the file. The linkage function is implemented by linking applications respectively associated with plural files selected by the user.

The files are, for example, a document file, an image file, a video file, a spreadsheet file, a presentation file, a graphic (drawing) file, and an audio file.

The document file is a file having a document format and is configured by character strings or other pieces of information. The document file may contain images, tables, or figures as other pieces of information. The document format is, for example, a text format or a document format. The document file corresponds to, for example, data having a text format (e.g., data appended with a character string ".txt" as an extension) or data having a document format (e.g., data appended with a character string".doc" or ".docx" as an extension).

The image file is a file having an image format. The image file may be image data having a raster format or image data having a vector format. The image format is, for example, a JPEG format, a BMP (bitmap) format, a PDF format, a GIF format, a TIFF format, or a PICT format. The image file corresponds to, for example, data having a JPEG format (data appended with a character string ".jpeg" as an extension), data having a BMP format (data appended with a character string ".bmp" as an extension), data having a PDF format (data appended with a character string ".pdf" as an extension), data having a GIF format (data appended with a character string ".gif" as an extension), data having a TIFF format (data appended with a character string ".tiff" as an extension), data having a PNG format (data appended with a character string ".png" as an extension), or data having a PICT format (data appended with a character string ".pict" as an extension). In addition, image data having a format other than the formats described above may be used as the image file according to the present exemplary embodiment.

The video file is a file having a video format. The video format is, for example, an AVI format, an MP4 format, an MOV format, an MPEG2-TS format, an MPEG2-PS format, a WMV format, or an FLV format. The video file corresponds to, for example, data having an AVI format (data appended with a character string ".avi" as an extension), data having an MP4 format (data appended with a character string ".mp4" as an extension), data having an MOV format (data appended with a character string ".mov" as an extension), data having an MPEG2-TS format (data appended with a character string ".m2ts" as an extension), data having an MPEG2-PS format (data appended with a character string ".mpeg" as an extension), data having a WMV format (data appended with a character string ".wmv" as an extension), or data having an FLV format (data appended with a character string ".flv" as an extension). In addition, video data having a format other than the formats described above may be used as the video file according to the present exemplary embodiment.

The spreadsheet file is a file having a table format and is configured by tables, graphs, or other pieces of information. The spreadsheet file may contain character strings, images, or figures as other pieces of information. For example, the spreadsheet file is data appended with a character string ".csv," ".xls" or ".xlsx" as an extension.

The presentation file is a file having a presentation sheet format. For example, the presentation file corresponds to data appended with a character string ".ppt" or ".pptx" as an extension. The presentation file is configured by, for example, character strings, images (still images or video), figures, and voice.

The graphic file is a file having a graphic (drawing) format. The graphic file is a file created by, for example, graphic generating software (e.g., two-dimensional or three-dimensional CAD). For example, the graphic file corresponds to data having a DXF format (data appended with a character string ".dxf" as an extension) or data having a DWG format (data appended with a character string ".dwg" as an extension). In addition, data appended with a character string ".vsd" or ".vsdx" as an extension may be treated as the graphic file.

The audio file is a file having an audio format. The audio format is, for example, an uncompressed audio format (e.g., a WAV format, an AIFF format, or a BWF format), a lossy compressed audio format (e.g., an mp3 format, an AAC format, or a WMA format), or a lossless compressed audio format (e.g., a TAK format or an FLAC format). For example, the audio file corresponds to data having an uncompressed audio format (data appended with, for example, a character string ".wav" as an extension), data having a lossy compressed audio format (data appended with, for example, a character string ".mp3" as an extension), or data having an uncompressed audio format (data appended with, for example, a character string ".tak" as an extension).

In the present exemplary embodiment, a linkage function is set for each file format (attribute), and the linkage function management information 16 is, for example, information indicating an association between information indicating a combination of plural file formats and information indicating a linkage function (linkage function information). The linkage function information is, for example, a linkage function ID and a linkage function name. The file format is, for example, the above-described document format, image format, video format, table format, sheet format, graphic format, or audio format. By referring to the linkage function management information 16, a linkage function associated with a combination of plural file formats is specified (identified).

For example, when a function to be used for a linkage function is updated (e.g., when software for implementing the function is updated), the linkage function is updated according to the updating of the function, and the linkage function management information 16 is also updated accordingly. As a result, a linkage function by plural functions which cannot be linked to each other prior to the updating may become usable after the updating, or in the meantime, a linkage function which is usable prior to the updating may become unusable after the updating. The linkage function information indicating the linkage function which becomes usable after the updating is registered in the linkage function management information 16, and the linkage function information indicating the linkage function which becomes unusable after the updating is deleted from the linkage function management information 16 or registered as unusable information. The terminal device 10 may update the linkage function management information 16 at any timing, periodically, or at a timing designated by, for example, the user. For example, when software for an updating is installed in the terminal device 10, a function is updated. The updating may be performed by using, for example, the Internet. In addition, when new software is installed in the terminal device 10, a usable linkage function is added, and the linkage function management information 16 is also updated accordingly.

The linkage function may be a function implemented by linking plural different functions (e.g., different pieces of software) to each other or a function implemented by linking identical functions (e.g., identical pieces of software) to each other. The linkage function may be a function which is unusable prior to the linkage. The function which is unusable prior to the linkage may be a function which becomes usable by linking identical functions to each other or by combining different functions with each other. For example, when a document creating function (document creating software) and an image displaying function (image displaying software (e.g., an image viewer)) are linked to each other, a function of inserting (attaching) an image into a document or a function of superimposing a document (a character string or a text) on an image is implemented as a linkage function. That is, when the document creating function and the image displaying function are linked to each other, an image inserting function or a text superimposing function is implemented.

The concept of the linkage function may include a coalescing function executable as a new function by combining plural functions with each other. For example, when plural displaying functions are combined with each other, an extended displaying function may be implemented as the coalescing function. In addition, when plural capturing functions are combined with each other, a capturing area extension function may be implemented as the coalescing function. In addition, when a call function and a translation function are combined with each other, a translated call function (a function of translating a phone conversation) may be implemented as the coalescing function. As described above, the concept of the linkage function may include a function which may be implemented by linking identical types of functions to each other and a function which may be implemented by linking different types of functions to each other.

A linkage function managed by the linkage function management information 16 may be a function executable by pieces of software installed in the terminal device 10, a function executable by pieces of software installed in an external device (e.g., the server or another terminal device), or a function executable by software installed in the terminal device 10 and software installed in an external device.

In addition, as another example of the linkage function management information 16, information indicating a combination of plural functions (plural pieces of software), and information indicating a linkage function executable by linking the plural functions to each other (linkage function information) may be associated with each other.

The storage unit 14 may store usable function management information. The usable function management information is information for managing a function usable by each user. The usable function management information indicates, for example, an association between information for identifying a user (user identification information) and function information (including linkage function information) indicating a function usable by the user. The function usable by the user is, for example, a function provided to the user for free or a function purchased by the user. The user identification information is, for example, user account information such as a user ID or a name. A function usable by each user is specified (identified) by referring to the usable function management information. The usable function management information is updated, for example, each time a function is provided to the user free of charge or for a fee.

A UI unit 18 is a user interface unit and includes a display unit and an operation unit. The display unit is, for example, a display device such as a liquid crystal display. The operation unit is, for example, an input device such as a touch panel or a keyboard. In addition, the UI unit 18 may be a user interface serving as both the display unit and the operation unit (e.g., a touch type display or a device of which display electronically displays a keyboard or the like).

A controller 20 controls the operation of each unit of the terminal device 10. The controller 20 controls, for example, a communication by the communication unit 12 and a display of various pieces of information on the display unit of the UI unit 18. Further, the controller 20 includes a specifying unit 22.

The specifying unit 22 has a function of specifying a linkage function associated with a combination of formats (file formats) of plural files selected by the user in the linkage function management information 16. Accordingly, a linkage function executable when plural files are selected is specified.

The controller 20 controls to notify (inform) the linkage function specified by the specifying unit 22. The controller 20 may display the information indicating the linkage function on the UI unit 18 or issue the information indicating the linkage function as voice information by using a speaker or the like. In addition, the controller 20 may control the execution of the linkage function. In addition, the user may select the files through the screen of the display unit of the UI unit 18 or by voice. For example, when an image associated with a file is displayed on the screen of the UI unit 18, the user may select the file by selecting the image on the screen. As another example, the user may select a file by voice, regardless of whether the image associated with the file is displayed on the screen of the UI unit 18. For example, when the user speaks a file name by voice, the voice is collected by a sound collecting unit such as a microphone, and voice information indicating the file name is input to the terminal device 10. The specifying unit 22 determines that the file having the file name is selected by the user, and specifies a linkage function. As described above, the operation to select a file and the notification of a linkage function may be performed either by a display on the screen or by voice. The display on the screen and the voice may be combined with each other. For example, the user may select an image associated with a file on the screen so as to select a file, and information indicating a linkage function may be displayed on the screen. As another example, a file may be selected in the manner that the user selects an image associated with the file on the screen, and information indicating a linkage function may be output by voice. As yet another example, a file may be selected in the manner that a file name is input as voice information to the terminal device 10, and information indicating a linkage function may be displayed on the screen. As yet another example, a file may be selected in the manner that a file name is input as voice information to the terminal device 10, and information indicating a linkage function may be output by voice.

When the function usable by the user is managed, the specifying unit 22 may receive the user identification information and specify a function associated with the user identification information in the usable function management information stored in the storage unit 14. For example, the specifying unit 22 receives identification information of the user who is logging into the terminal device 10, and specifies a function associated with the user identification information in the usable function management information. Further, the specifying unit 22 receives information indicating a file format of each of plural files selected by the user, and specifies a linkage function associated with the combination of the plural file formats in the linkage function management information 16. A linkage function that is the function associated with the user identification information in the usable function management information and that is associated with the combination of the file formats of the respective plural files selected by the user is a linkage function usable by the user.

In addition, the linkage function management information 16 may be stored in an external device (e.g., a server) other than the terminal device 10. In this case, the linkage function management information 16 may not be stored in the terminal device 10. In addition, the specifying unit 22 may be provided in an external device. In this case, the specifying unit 22 may not be provided in the terminal device 10. That is, the management of a linkage function or the process of specifying a linkage function based on file formats may be performed by the terminal device 10 or an external device. When the specifying process is performed by an external device, the result of the process (e.g., information indicating a specified linkage function) is transmitted from the external device to the terminal device 10 and displayed on the UI unit 18.

Hereinafter, the terminal device 10 will be described in more detail.

The linkage function management information 16 will be described in detail with reference to FIG. 2. FIG. 2 illustrates an example of a linkage function management table which is the linkage function management information 16. In the linkage function management table, for example, information indicating a combination of plural file formats and information indicating a linkage function (linkage function information) are associated with each other. For example, when the user selects plural files by using the UI unit 18, the specifying unit 22 specifies a linkage function associated with a combination of file formats of the respective plural files in the linkage function management table. For example, the controller 20 displays the information on the linkage function (e.g., linkage function information or linkage function explanation information) on the UI unit 18. In addition, while FIG. 2 represents a combination of two file formats, an association between a combination of three or more file formats and a linkage function may be registered in the linkage function management table.

Hereinafter, each file format illustrated in FIG. 2 will be described.

In FIG. 2, the "document format" is a text format (with an extension of ".txt") or a document format (with an extension of ".doc" or ".docx"). The "table format" is a format with an extension expressed as, for example, ".csv" or ".xls." The "image format" is a format with an extension expressed as, for example, ".jpeg" or ".pdf." The "video format" is a format with an extension expressed as, for example, ".avi" or ".mpeg." The "sheet format" is a format with an extension expressed as, for example, ".ppt." While FIG. 2 does not illustrate the graphic format or the audio format, an association between a combination of file formats including the graphic format and the audio format and a linkage function may be registered in the linkage function management table. In addition, an association between a combination of file formats other than the file formats illustrated in FIG. 2 and a linkage function may be defined and registered in the linkage function management table.

Hereinafter, each linkage function illustrated in FIG. 2 will be described. When the user selects a document file A and a spreadsheet file B, a "function of inserting a table into a document" and a "function of inserting a document into a table" which are associated with the combination of the document format and the table format are specified as linkage functions. The "function of inserting a table into a document" is a function of inserting the table represented by the spreadsheet file B into the document represented by the document file A. The "function of inserting a document into a table" is a function of inserting the document represented by the document file A into the table represented by the spreadsheet file B.

When the user selects the document file A and an image file C, a "function of inserting an image into a document" and a "function of superimposing a document on an image" which are associated with the combination of the document format and the image format are specified as linkage functions. The "function of inserting an image into a document" is a function of inserting the image represented by the image file C into the document represented by the document file A. The "function of superimposing a document on an image" is a function of superimposing the document represented by the document file A on the image represented by the image file C.

When the user selects the document file A and a video file D, a "function of inserting a video into a document" and a "function of inserting a still image into a document" which are associated with the combination of the document format and the video format are specified as linkage functions. The "function of inserting a video into a document" is a function of inserting the video represented by the video file D into the document represented by the document file A. The "function of inserting a still image into a document" is a function of inserting one or plural frames (still images) included in the video file D into the document represented by the document file A. For example, when the document file A is a document file not compatible with a video, that is, a file into which a video cannot be inserted and when the "function of inserting a still image into a document" is executed, one or plural frames (still images) included in the video file D are inserted into the document represented by the document file A.

Plural files having the same file format may be selected by the user. For example, when the user selects document files A1 and A2, a "function of integrating documents" which is associated with the combination of the document formats is specified as a linkage function. The "function of integrating documents" is a function of integrating the documents represented by the document files A1 and A2 with each other (e.g., combining the two documents with each other), and generates a new document file A3 while saving or removing the document files A1 and A2.

When the user selects spreadsheet files B1 and B2, a "function of integrating tables" which is associated with the combination of the table formats is specified as a linkage function. The "function of integrating tables" is a function of integrating the tables represented by the spreadsheet files B1 and B2 with each other (e.g., combining the two tables with each other), and generates a new spreadsheet file B3 while saving or removing the spreadsheet files B1 and B2.

When the user selects video files D1 and D2, a "function of integrating videos" which is associated with the combination of the video formats is specified as a linkage function. The "function of integrating videos" is a function of integrating the videos represented by the video files D1 and D2 with each other (e.g., combining the two videos with each other), and generates a new video file D3 while saving or removing the video files D1 and D2.

In addition, when the user selects a presentation file E and the document file A, a "function of inserting a document into a presentation sheet" which is associated with the combination of the sheet format and the document format is specified as a linkage function. The "function of inserting a document into a presentation sheet" is a function of inserting the document represented by the document file A into the sheet represented by the presentation file E.

Hereinafter, the operation of the terminal device 10 will be described in detail.

Figure 3:
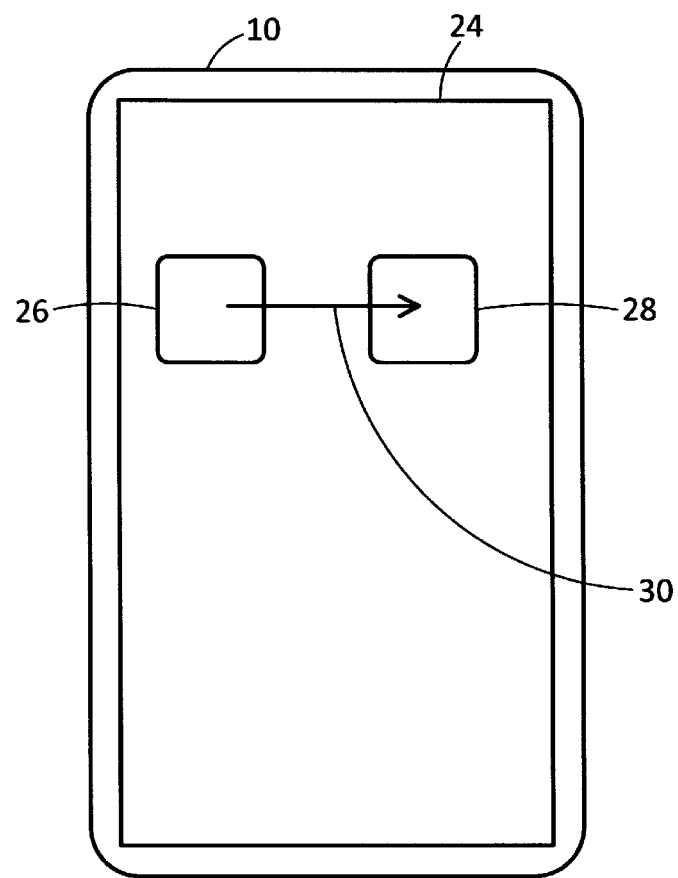
FIG. 3 is a view illustrating an example of a screen.

FIG. 3 illustrates an example of a screen displayed on the UI unit 18 of the terminal device 10. A screen 24 displays images (e.g., icons) associated with various files or images (e.g., icons) associated with various pieces of software.

In the example illustrated in FIG. 3, the screen 24 displays an image 26 associated with the document file A and an image 28 associated with the image file C. When the user selects the images 26 and 28 on the screen 24, the document file A and the image file C are selected as files to be linked.

For example, when the user connects the images 26 and 28 to each other on the screen 24 as indicated by an arrow 30, the specifying unit 22 identifies the document file A associated with the image 26 and the image file C associated with the image 28 as files to be linked. Further, the specifying unit 22 identifies the file format of the document file A based on the extension of the document file A (e.g., the extension associated with the document file A as attribute information of the document file A). Similarly, the specifying unit 22 identifies the file format of the image file C based on the extension of the image file C (e.g., the extension associated with the image file C as attribute information of the image file C). In addition, the extension may be included in a file name. When the extension of the document file A corresponds to an extension representing the document format such as ".txt" or ".docx," the specifying unit 22 identifies that the file format of the document file A is the document format. When the extension of the image file C corresponds to an extension representing the image format such as ".jpeg," the specifying unit 22 identifies that the file format of the image file C is the image format. Then, the specifying unit 22 specifies the linkage functions associated with the combination of the document format and the image format (the "function of inserting an image into a document" and the "function of superimposing a document on an image") in the linkage function management table illustrated in FIG. 2. In addition, the user may select the files by voice. The same applies to exemplary embodiments which will be described later.

For example, when the user traces over plural images (the images 26 and 28 in the example described above) (e.g., touches and traces over images) with a pointer (e.g., the user's finger, a pen, or a stylus) on the screen 24, the plural images are connected to each other. The controller 20 detects that the pointer touches the screen 24 and detects the movement of the pointer on the screen 24. In addition, an order of designating the images 26 and 28 and an order of connecting the images 26 and 28 to each other may be opposite to the direction indicated by the arrow 30.

Figure 4:
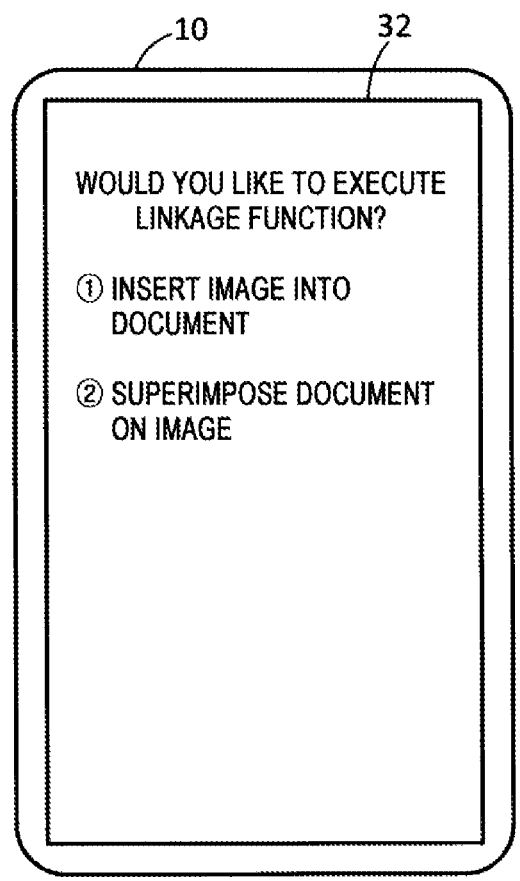
FIG. 4 is a view illustrating an example of a screen.

When the linkage functions are specified by the specifying unit 22 as described above, the controller 20 displays the information indicating the specified linkage functions on the UI unit 18. FIG. 4 illustrates an example of the display. The controller 20 causes the display unit of the UI unit 18 to display a screen 32 and displays the information indicating the linkage functions specified by the specifying unit 22 on the screen 32. In the example described above, the information indicating the "function of inserting an image into a document" and the information indicating the "function of superimposing a document on an image" are displayed as linkage functions on the screen 32. In addition, the information indicating the linkage functions may be issued as voice information. The same applies to exemplary embodiments which will be described later.

When the user designates a linkage function and gives an execution instruction on the screen 32, the controller 20 executes the designated linkage function. For example, when the user gives an instruction to execute the "function of inserting an image into a document," the controller 20 inserts the image represented by the image file C into the document represented by the document file A. In addition, the user may give the instruction to execute the linkage function by voice. The same applies to exemplary embodiments which will be described later.

More specifically, the controller 20 activates a document application and an image application. The document application is software (program) having a function of creating, editing, and displaying a file having the document format. The image application is software (program) having a function of creating, editing, and displaying a file having the image format. In addition, the document application may be associated with the document file A in advance, and the image application may be associated with the image file C in advance. The controller 20 copies the image of the image file C by using a function that the image application has, and pastes the image into the document represented by the document file A by using a function that the document application has. Accordingly, the document into which the image is inserted is generated. In addition, the controller 20 may extract a portion image representing a specific portion from the image represented by the image file C by a function that the image application has, and paste the portion image into the document. An area where the image is pasted in the document may be a predetermined area, an area designated by the user, or an area presumed to be written with a character string related to the image. For example, the controller 20 presumes or searches for a character string expressing a feature portion represented in the image, and presumes that, in the document, an area in which a character string having the same or similar meaning to the searched character string is written is an area in which the character string related to the image is written. In addition, the area may be presumed by another method.

Similarly, when the user gives an instruction to execute the "function of superimposing a document on an image," the entire document represented by the document file A or a part of the document represented by the document file A is copied by the function that the document application has, and the copied document or parts are superimposed on the image represented by the image file C. The part to be copied from the document may be defined in advance or designated by the user. In addition, a portion of the image where the document is to be superimposed may be defined in advance or designated by the user.

Figure 5:
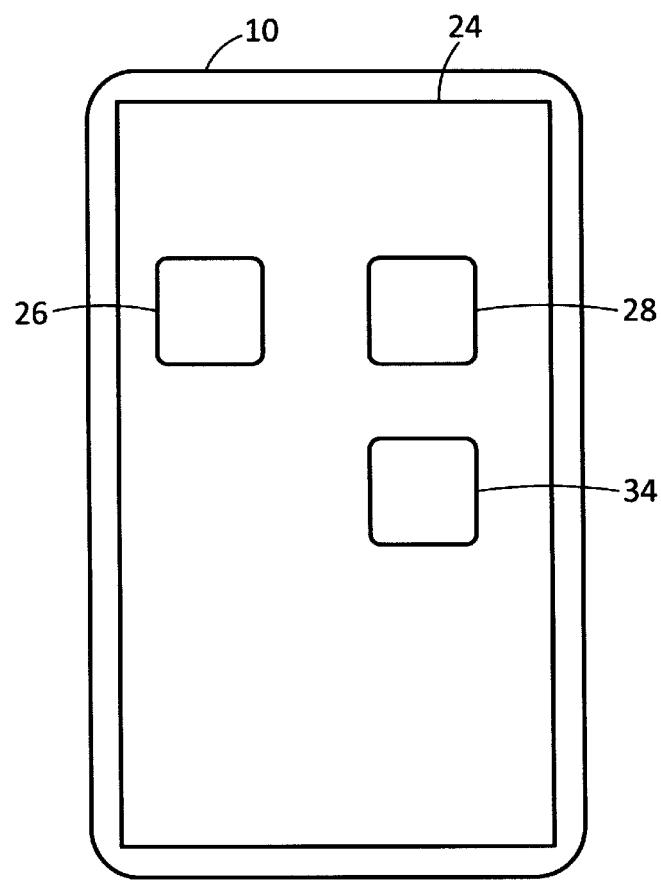
FIG. 5 is a view illustrating an example of a screen.

The controller 20 may generate a new file by executing a linkage function. In this case, the plural files themselves selected as objects to be linked are not edited. For example, when the document file A and the image file C are selected as files to be linked, and an instruction to execute the "function of inserting an image into a document" is given, the controller 20 generates a new document file AC by pasting the image represented by the image file C into the document represented by the document file A. In this case, as illustrated in FIG. 5, the controller 20 generates a new image 34 (e.g., an icon) associated with the document file AC and displays the image 34 on the screen 24. In this case, the document file A and the image file C themselves are not edited, and the images 26 and 28 are displayed on the screen 24.

Similarly, when an instruction to execute the "function of superimposing a document on an image" is given, the controller 20 generates a new image file CA by superimposing the entire document represented by the document file A or a part of the document represented by the document file A on the image represented by the image file C, and generates a new image associated with the image file CA. The new image is displayed on the screen 24. In this case as well, the document file A and the image file C themselves are not edited, and the images 26 and 28 are displayed on the screen 24.

As another example, the controller 20 may edit (including, for example, a process) the files themselves selected as objects to be linked, without generating a new file, when executing a linkage function. Referring to the example described above, the controller 20 pastes the image represented by the image file C into the document represented by the document file A, and saves the document file in which the pasting of the image is reflected, as the document file A. In this case, the document file A is updated.

Figure 6:
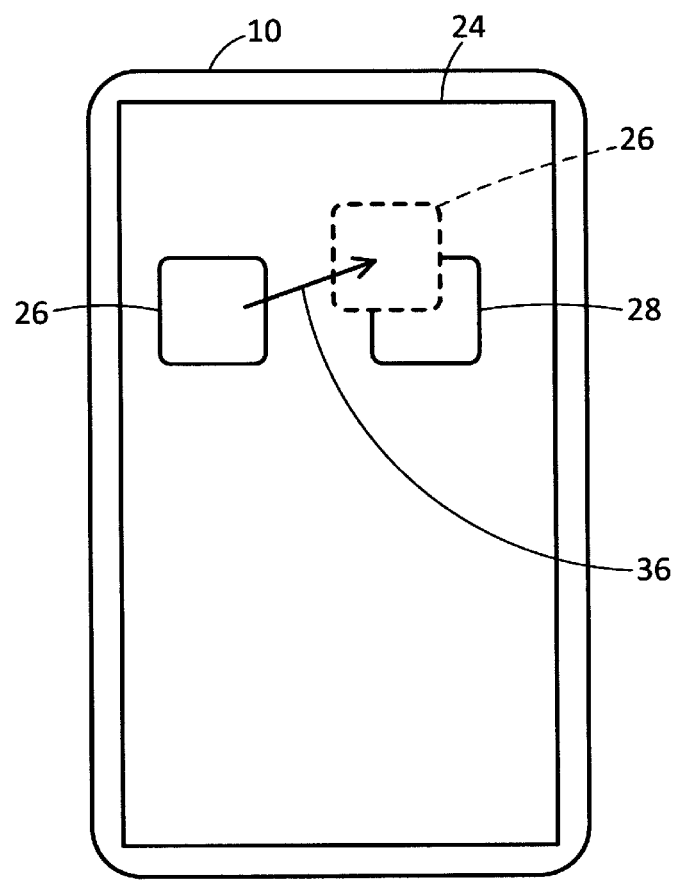
FIG. 6 is a view illustrating an example of a screen.

Hereinafter, another example of the operation will be described with reference to FIG. 6. FIG. 6 illustrates the screen 24. The screen 24 displays the images 26 and 28 as in the example illustrated in FIG. 3. For example, when the user moves the image 26 to the image 28 and superimposes the image 26 on the image 28 as indicated by an arrow 36 on the screen 24, the specifying unit 22 identifies the document file A associated with the image 26 and the image file C associated with the image 28 as files to be linked. Further, as described above, the specifying unit 22 specifies the file format of each of the document file A and the image file C, and specifies the linkage functions associated with the combination of the document format and the image format in the linkage function management table. The information indicating the specified linkage functions is displayed on the display unit of the UI unit 18 as illustrated in FIG. 4. For example, the user superimposes an image on another image by performing the dragging and dropping operation with the pointer. In the example illustrated in FIG. 6, the user drags the image 26 (indicated by a dashed line) and drops the image 26 at the position where the image 26 is superimposed on the image 28. In addition, the superimposing operation may be performed by a voice instruction from the user. In a case where the user superimposes the image 28 on the image 26 as well, the document file A and the image file C are identified as files to be linked, and the linkage functions associated with the combination of the document format and the image format are specified.

In the example illustrated in FIG. 6 as well, a new file (e.g., the document file AC) may be generated as a result of the execution of a linkage function, and an image associated with the new file (e.g., the image 34 associated with the document file AC) may be generated. As another example, a file to be linked (e.g., the document file A) may be updated as a result of the execution of a linkage function.

When plural images are superimposed on each other, the controller 20 may generate a new composite image representing the superimposed state of the plural images. The composite image is an image associated with a file reflecting the result of the execution of a linkage function. For example, it is assumed that the images 26 and 28 are superimposed on each other so that a linkage function is executed. In this case, the controller 20 generates a new composite image representing the superimposed state of the images 26 and 28. The composite image may be an image representing the state where the image 26 is superimposed on the image 28 or the image 28 is superimposed on the image 26, or an image schematically representing the state. In the example described above, the composite image is the image associated with the document file AC or the image file CA (e.g., the image 34 illustrated in FIG. 5). In addition, even though the composite image is generated, the original images 26 and 28 are still displayed as they are.

When the composite image is generated as described above, the controller 20 displays the composite image on the screen 24. In a case where the composite image is superimposed on an image associated with another file, the specifying unit 22 identifies the file associated with the composite image and the other file as files to be linked. In this case, the specifying unit 22 specifies the linkage function associated with the combination of the file format of the file associated with the composite image and the file format of the other file in the linkage function management table illustrated in FIG. 2. The information indicating the linkage function is displayed on the display unit of the UI unit 18.

For example, when the composite image is an image associated with the document file AC, the specifying unit 22 identifies that the file format of the document file AC is the document format. In addition, when the composite image is an image associated with the image file CA, the specifying unit 22 identifies that the file format of the image file CA is the image format.

By generating and displaying the composite image as described above, it is possible to provide the user with files processed as objects to be linked in a state where the files are visually and easily recognized.

A file to be linked may be selected by a method other than the method described above. For example, a file to be linked may be selected by a drawing operation such as drawing a circle on an image associated with a file. In addition, the specifying unit 22 may identify a file selected by the user within a predetermined time limit, as a file to be linked. A starting time point of the time limit is, for example, a time point when a first file is selected by the user. When plural images associated with plural files are connected to or superimposed on each other within the time limit or the drawing operation is performed on the plural images within the time limit, the specifying unit 22 identifies the plural files as files to be linked and specifies a linkage function associated with the combination of the file formats of the plural files.

In addition, in order to release the linkage, the user may select files to be released from the linkage on the screen 24, or press a linkage release button displayed on the screen 24.

As another example, a file to be linked may be determined in advance. In addition, a linkage area may be defined on the screen 24, and the specifying unit 22 may identify a file associated with an image displayed in the linkage area as a file to be linked. For example, when the user operates an image displayed on the screen 24 to move the image to the linkage area, the file associated with the image is identified as a file to be linked. When the user gives an instruction to display a linkage function (e.g., when the user presses a button for giving the instruction) in a state where plural images are displayed in the linkage area, the specifying unit 22 identifies a linkage function associated with a combination of formats of plural files associated with the plural images. The information indicating the specified linkage function is displayed on the display unit of the UI unit 18. For example, when the images 26 and 28 are moved to the linkage area and the instruction to display a linkage function is given, the information illustrated in FIG. 4 is displayed on the screen 32.

Modification 1

Hereinafter, Modification 1 will be described. In Modification 1, a display of information on a linkage function or a linkage function to be executed is changed according to an order of selecting plural files.

FIG. 7 illustrates an example of a linkage function management table according to Modification 1. In the linkage function management table, for example, information indicating a combination of file formats, information indicating an order of selecting files, and information indicating a linkage function and a priority (linkage function information) are associated with each other. The selecting order is an order of selecting files and is, for example, an order of connecting images associated with files to each other or an order of superimposing the images on each other. For example, when the user selects plural files in order, the order of the selection corresponds to the "selecting order." More specifically, when the user connects a first image associated with a first file to a second image associated with a second file, the selecting order of the first file is first, and the selecting order of the second file is second. In addition, when the user superimposes the first image on the second image, the selecting order of the first file is first, and the selecting order of the second file is second. The priority is a priority for displaying information on a linkage function.

The linkage functions associated with the combination of the document format and the image format are the "function of inserting an image into a document" and the "function of superimposing a document on an image."

For example, when the user selects the document file and the image file in this order (e.g., when the image associated with the document file is connected to or superimposed on the image associated with the image file), the selecting order of the document file is first, and the selecting order of the image file is second. In this case, the "function of superimposing a document on an image" has the "first priority," and the "function of inserting an image into a document" has the "second priority." In this case, the information on the "function of superimposing a document on an image" is displayed in preference to the information on the "function of inserting an image into a document." For example, the information on the "function of superimposing a document on an image" is displayed at a higher rank or earlier than the information on the "function of inserting an image into a document."

Meanwhile, when the user selects the image file and the document file in this order (e.g., when the image associated with the image file is connected to or superimposed on the image associated with the document file), the selecting order of the image file is first, and the selecting order of the document file is second. In this case, the "function of inserting an image into a document" has the "first priority," and the "function of superimposing a document on an image" has the "second priority." In this case, the information on the "function of inserting an image into a document" is displayed in preference to the information on the "function of superimposing a document on an image." For example, the information on the "function of inserting an image into a document" is displayed at a higher rank or earlier than the information on the "function of superimposing a document on an image."

Figure 8:
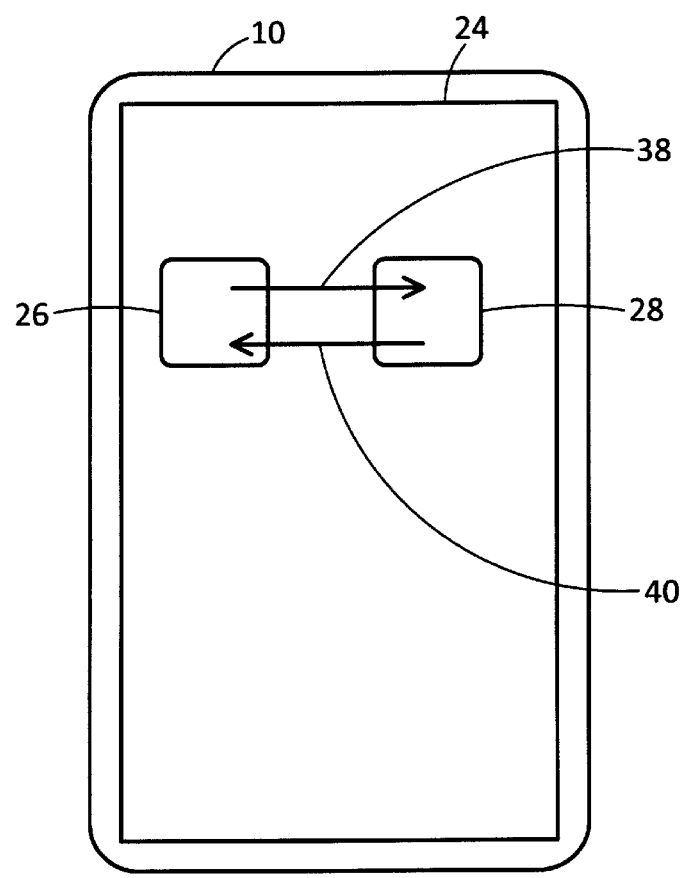
FIG. 8 is a view illustrating an example of a screen.

Hereinafter, Modification 1 will be described using specific examples. FIG. 8 illustrates the screen 24. The screen 24 displays the image 26 associated with the document file A and the image 28 associated with the image file C.

Figure 9:
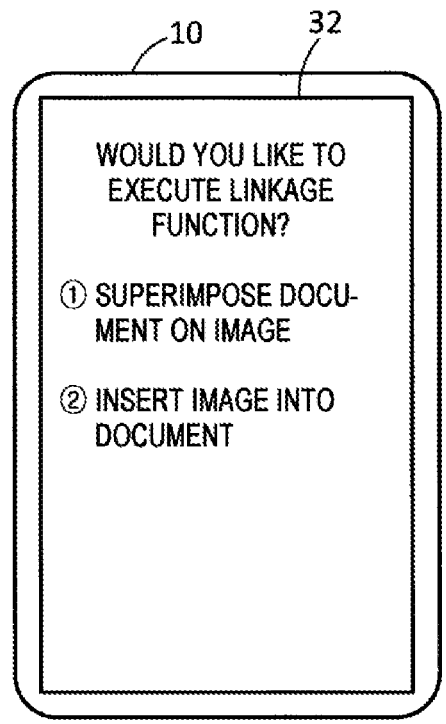
FIG. 9 is a view illustrating an example of a screen.

For example, when the user selects the image 26 first, and then, connects the image 26 to the image 28 as indicated by an arrow 38, the selecting order of the document file A is first, and the selecting order of the image file C is second. In this case, the "function of superimposing a document on an image" has the "first priority," and the "function of inserting an image into a document" has the "second priority" (see FIG. 7). FIG. 9 illustrates an example of the display in this case. As illustrated in FIG. 9, the controller 20 displays, on the screen 32 of the UI unit 18, the information on the "function of superimposing a document on an image" in preference to (e.g., at a higher rank than) the "function of inserting an image into a document."

Figure 10:
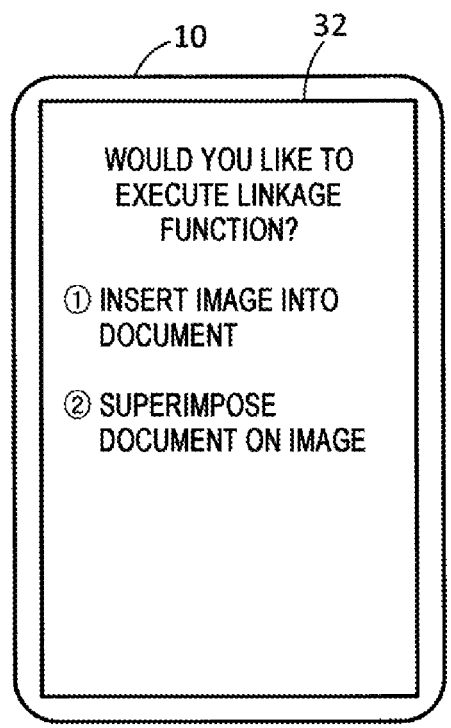
FIG. 10 is a view illustrating an example of a screen.

Meanwhile, when the user selects the image 28 first, and then, connects the image 28 to the image 26 as indicated by an arrow 40, the selecting order of the image file C is first, and the selecting order of the document file A is second. In this case, the "function of inserting an image into a document" has the "first priority," and the "function of superimposing a document on an image" has the "second priority." FIG. 10 illustrates an example of the display in this case. As illustrated in FIG. 10, the controller 20 displays, on the screen 32 of the UI unit 18, the information on the "function of inserting an image into a document" in preference to (e.g., at a higher rank than) the information on the "function of superimposing a document on an image."

When the user designates a linkage function on the screen 32 illustrated in FIG. 9 or 10 and gives an instruction to execute the linkage function, the designated linkage function is executed.

As described above, in Modification 1, the priority for displaying information on a linkage function is changed according to the order of selecting files. The order of selecting files also serves as an order of selecting a pasting target or a pasting destination of contents represented in files (e.g., a document, image, video, table, sheet, figure, and voice). Thus, by changing the priority for displaying information on a linkage function according to the order of selecting files, information on a linkage function which is predicted to be used by the user is preferentially displayed. That is, information on a linkage function which is predicted to be more likely to be used by the user is preferentially displayed. For example, when the image 26 associated with the document file A and the image 28 associated with the image file C are selected in this order, a linkage function of "superimposing the document represented by the document file A on the image represented by the image file C" is predicted to be used by the user. In addition, when the image 28 associated with the image file C and the image 26 associated with the document file A are selected in this order, a linkage function of "inserting the image represented by the image file C into the document represented by the document file A" is predicted to be used by the user. Thus, by changing the priority for displaying information on a linkage function according to the order of selecting files, information on a linkage function which is predicted to more likely to be used by the user is preferentially displayed.

Modification 2

Hereinafter, Modification 2 will be described. In Modification 2, the display of information on a linkage function or a linkage function to be executed is changed according to a master-servant relationship of files. For example, a file of which represented contents themselves are editable corresponds to a master file, and a file of which contents themselves are not editable corresponds to a servant file. For example, when a document itself represented in a document file is editable, the document file corresponds to the master file. In addition, when an image itself represented in an image file is not editable (that is, when contents may be superimposed on an image, but the image itself is not editable), the image file corresponds to the servant file. This relationship is similarly applied to other files. In addition, a document file also corresponds to the servant file when the document of the document file is not editable, and an image file also corresponds to the master file when the image of the image file is editable.

The specifying unit 22 may determine whether a file corresponds to the master file or the servant file, based on a file format (i.e., an extension). For example, the specifying unit 22 may determine that a file having the document format, a file having the table format, a file having the sheet format, and a file having the graphic format correspond to master files, and a file having the image format, a file having the video format, and a file having the audio format correspond to servant files. In addition, the determination as to whether a file corresponds to the master file or the servant file may not be made just based on the file formats, and may be made by individually determining files selected as objects to be linked. For example, even a file having the image format may correspond to the master file when the image of the file is editable.

Figure 11:
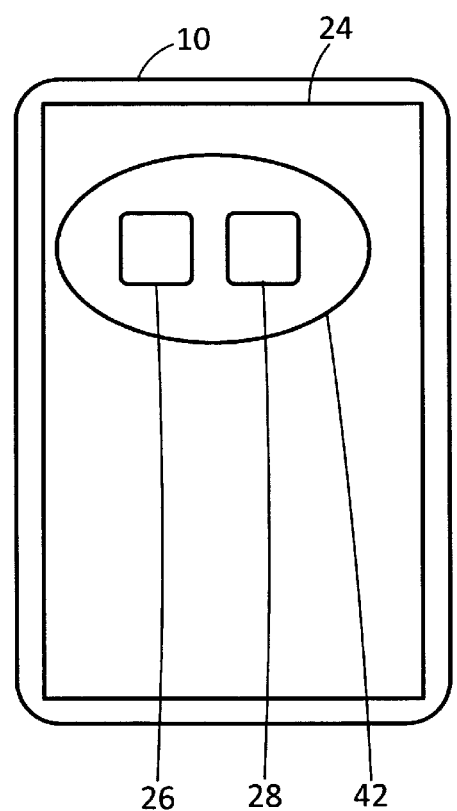
FIG. 11 is a view illustrating an example of a screen.

Hereinafter, Modification 2 will be described using specific examples with reference to FIG. 11. FIG. 11 illustrates the screen 24 displayed on the UI unit 18. The screen 24 displays the image 26 associated with the document file A and the image 28 associated with the image file C. For example, when the user designates an area for surrounding the images 26 and 28 (e.g., when the user traces over the screen 24 with the pointer) as indicated by a reference numeral 42, the specifying unit 22 identifies the document file A associated with the image 26 and the image file C associated with the image 28 as files to be linked.

Further, the specifying unit 22 determines whether the document file A corresponds to the master file or the servant file, based on the extension associated with the document file A. Similarly, the specifying unit 22 determines whether the image file C corresponds to the master file or the servant file, based on the extension associated with the image file C. For example, it is assumed that the extension of the document file A is ".docx," and the extension of the image file C is ".jpeg." In this case, since the document file A has the document format and corresponds to an editable file, the specifying unit 22 determines that the document file A corresponds to the master file. Further, since the image file C has the image format and corresponds to an uneditable file, the specifying unit 22 determines that the image file C corresponds to the servant file. In addition, the specifying unit 22 may determine whether the document file A and the image file C correspond to editable files, by individually determining the document file A and the image file C, rather than making the determination based on the extensions.

Since the document file A corresponds to the master file and the image file C corresponds to the servant file, the image represented in the image file C corresponds to a content which is the pasting target, and the document represented in the document file A corresponds to a content which is the pasting destination of the image. In this case, the specifying unit 22 specifies the "function of inserting an image into a document" as a linkage function. The controller 20 displays the information on the "function of inserting an image into a document" on the UI unit 18. When the specifying unit 22 specifies plural linkage functions, the controller 20 displays the information on the plural linkage functions on the UI unit 18.

In addition, the controller 20 may display the information on the linkage function which is specified based on the master-servant relationship of files among the plural linkage functions registered in the linkage function management table, on the UI unit 18 in preference to the information on the other linkage functions. Referring to the example of the document file A and the image file C, the "function of inserting an image into a document" and the "function of superimposing a document on an image" are registered as linkage functions associated with the combination of the document format and the image format in the linkage function management table (see FIG. 2). In this case, the specifying unit 22 specifies the "function of inserting an image into a document" which is specified based on the master-servant relationship of the files, as a linkage function having a "first priority," and specifies the "function of superimposing a document on an image" as a linkage function having a "second priority." According to the priorities, the controller 20 displays, on the UI unit 18, the information on the "function of inserting an image into a document" in preference to (e.g., at a higher rank than) the information on the "function of superimposing a document on an image."

In addition, when the user designates the area for surrounding the images 26 and 28, and then, gives an instruction to display a linkage function on the screen 24 illustrated in FIG. 11, the controller 20 may display the information on the linkage functions specified by the specifying unit 22 on the UI unit 18. For example, when the user presses a specific button of a mouse (e.g., right click) constituting the operation unit of the UI unit 18, the instruction to display a linkage function is given.

In addition, when plural linkage functions are specified based on the master-servant relationship of files, the controller 20 may determine priorities of the respective linkage functions based on a history of use of each linkage function by the user, and display the information on the linkage functions according to the priorities of the linkage functions on the UI unit 18. For example, the controller 20 preferentially display information on a linkage function having a relatively high use frequency on the UI unit 18 (e.g., at a higher rank).

In addition, when plural linkage functions are specified based on the master-servant relationship of files, the controller 20 may determine priorities of the respective linkage functions based on a relationship among the plural files selected as objects to be linked (i.e., a relationship among plural file formats), and display the information on the linkage functions according to the priorities of the linkage functions on the UI unit 18. For example, the controller 20 determines the likelihood that each linkage function included in the plural linkage functions specified by the specifying unit 22 is to be used, based on the plural file formats. The controller 20 displays information on a linkage function which is more likely to be used, preferentially (e.g., at a higher rank) on the UI unit 18. For example, in the combination of the document format and the image format, it is predicted that the use likelihood of the "function of inserting an image into a document" is higher than that of the "function of superimposing a document on an image." In this case, the controller 20 displays the information on the "function of inserting an image into a document" on the UI unit 18, in preference to the "function of superimposing a document on an image."

Modification 3

Hereinafter, Modification 3 will be described. In Modification 3, a linkage function is changed according to a combination of plural portions in an image associated with a file. For example, when images associated with files include portion images and a user designates plural portion images, information on a linkage function corresponding to the plural portion images is displayed. Hereinafter, an image associated with a file will be referred to as an "entire image" to distinguish the image associated with the file from a "portion image." Hereinafter, Modification 3 will be described in detail.

Figure 12:
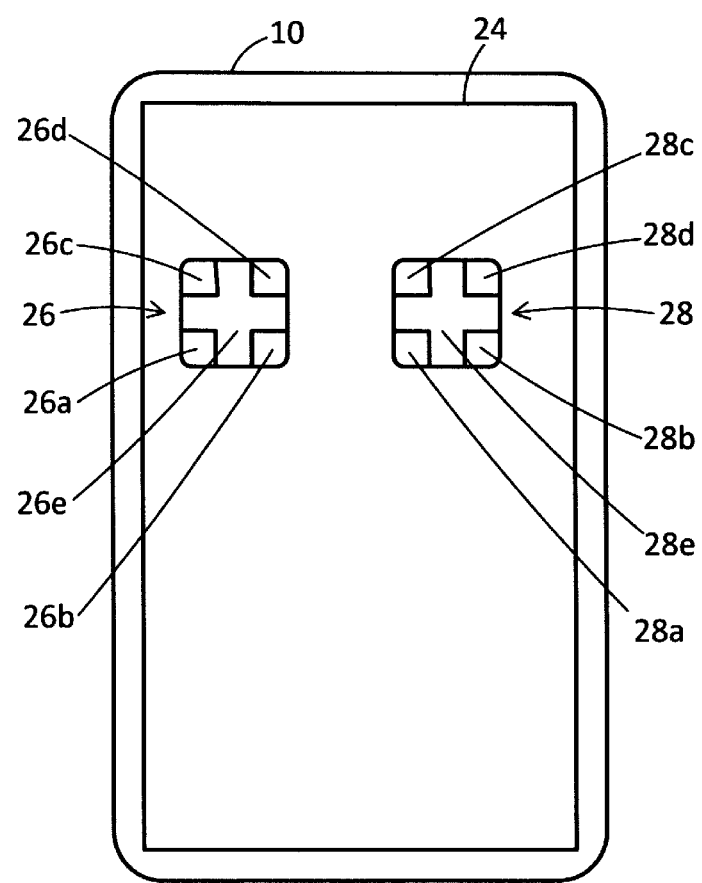
FIG. 12 is a view illustrating an example of a screen.

FIG. 12 illustrates the screen 24 displayed on the UI unit 18. The screen 24 displays the image 26 associated with the document file A (hereinafter, referred to as an "entire image 26") and the image 28 associated with the image file C (hereinafter, referred to as an "entire image 28"). The entire image 26 includes, for example, portion images 26*a*, 26*b*, 26*c*, 26*d*, and 26*e*. In addition, the portion image 26*e* constitutes a main body portion of the entire image 26. When the portion image 26*e* is selected (e.g., when the portion image 26*e* is pressed) by the user, the controller 20 recognizes that the entire image 26 is selected by the user. Similarly, the entire image 28 includes, for example, portion images 28*a*, 28*b*, 28*c*, 28*d*, and 28*e*. In addition, the portion image 28*e* constitutes a main body portion of the entire image 28. When the portion image 28*e* is selected (e.g., when the portion image 28*e* is pressed) by the user, the controller 20 recognizes that the entire image 28 is selected by the user.

When the user selects plural portion images, the specifying unit 22 identifies, for each of the selected portion images, a file associated with the entire image including the portion image as a file to be linked. Then, the specifying unit 22 specifies a linkage function that is associated with the combination of formats of the plural files selected as objects to be linked and that is associated with the combination of the plural selected portion images.

For example, in the linkage function management table according to Modification 3, a linkage function associated with a combination of plural file formats and associated with a combination of plural portion images is registered. By referring to the linkage function management table, the specifying unit 22 specifies a linkage function associated with the combination of the plural portion images selected by the user.

Specific examples in this regard will be described. For example, when the user selects the portion image 26*a* associated with the document file A and the portion image 28*a* associated with the image file C, the specifying unit 22 specifies the "function of inserting an image into a document" as a linkage function. In addition, when the user designates the portion image 26*b* associated with the document file A and the portion image 28*b* associated with the image file C, the specifying unit 22 specifies the "function of superimposing a document on an image" as a linkage function. The same applies to the other portion images. The controller 20 displays the information on the linkage function specified by the specifying unit 22 on the UI unit 18.

In addition, the user may select a portion image and an entire image. In this case as well, a linkage function associated with the combination of the portion image and the entire image is specified. For example, the user may select an entire image including no portion image and a portion image included in another entire image.

Figure 13:
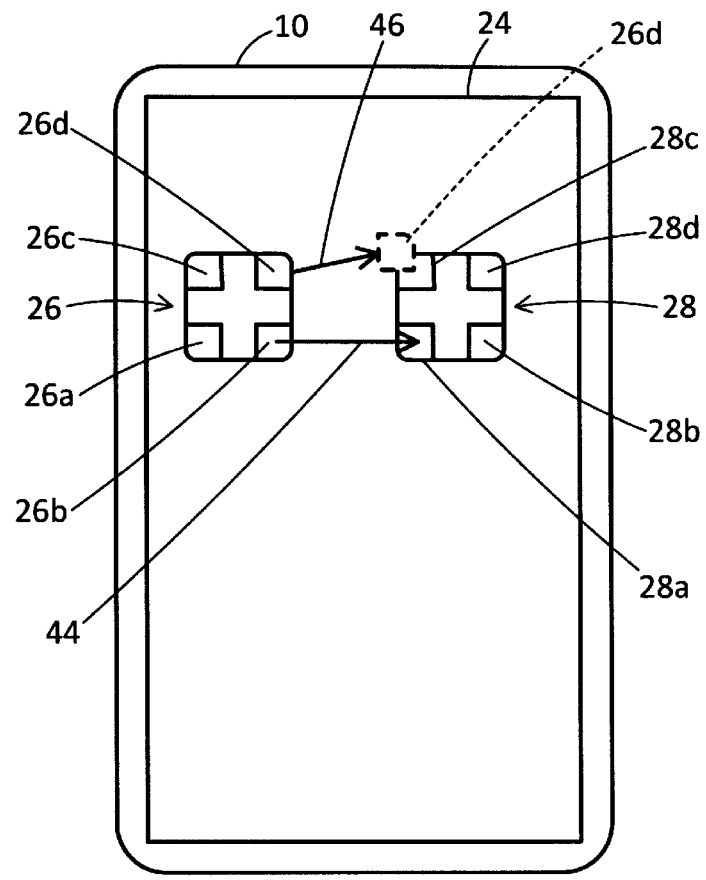
FIG. 13 is a view illustrating an example of a screen.

Hereinafter, a method of selecting a portion image will be described with reference to FIG. 13. FIG. 13 illustrates the screen 24 displayed on the UI unit 18. For example, when the user connects the portion images 26*b* and 28*a* to each other as indicated by an arrow 44 by using the pointer on the screen 24 (e.g., when the user traces over between the portion images 26*b* and 28*a*), the specifying unit 22 detects that the user selects the portion images 26*b* and 28*a*, and identifies the document file A and the image file C as files to be linked. The specifying unit 22 specifies the linkage function associated with the combination of the portion images 26*b* and 28*a*, and the controller 20 displays the information on the specified linkage function on the UI unit 18.

In addition, a portion image may be an image which is separable and movable from an entire image. For example, when the user selects the portion image 26*d* and moves the portion image 26*d* to the position of the portion image 28*c* (when the user drags and drops the portion image 26*d*) as indicated by an arrow 46, the specifying unit 22 detects that the user selects the portion images 26*d* and 28*c*, and identifies the document file A and the image file C as files to be linked. FIG. 13 illustrates the movement of the portion image 26*d* by a dashed line. Even when the portion image 26*d* is moved by the user, the original portion image 26*d* of the entire image 26 is still displayed in the state prior to the movement. The specifying unit 22 specifies the linkage function associated with the combination of the portion images 26*d* and 28*c*, and the controller 20 displays the information on the specified linkage function on the UI unit 18.

According to Modification 3, since information on a linkage function corresponding to portion images selected by the user is displayed, the linkage function may be changed according to portions, even when the user selects images associated with the same file.

In addition, plural portion images may be selected from the same entire image, and information on a linkage function associated with the combination of the plural portion images may be displayed. In addition, when three or more portion images are selected from the same entire image or different entire images, information on a linkage function associated with the three or more portion images may be displayed.

In addition, Modifications 1 and 3 may be combined with each other. That is, the display of information on a linkage function may be switched according to an order of selecting portion images. In the example illustrated in FIG. 12, the display of information on different linkage functions may be switched such that one linkage function is displayed in a case where the portion image 26*a* is selected first and then the portion image 28*a* is selected, and the other linkage function is displayed in a case where the portion image 28*a* is selected first and then the portion image 26*a* is selected.

For example, when the portion images 26a and 28a are selected in this order, the "function of superimposing a document on an image" has the "first priority," and the "function of inserting an image into a document" has the "second priority." In this case, the controller 20 displays the information on the "function of superimposing a document on an image" in preference to (e.g., at a higher rank than) the information on the "function of inserting an image into a document" on the UI unit 18.

Meanwhile, when the portion images 28a and 26a are selected in this order, the "function of inserting an image into a document" has the "first priority," and the "function of superimposing a document on an image" has the "second priority." In this case, the controller 20 displays the information on the "function of inserting an image into a document" in preference to (e.g., at a higher rank than) the information on the "function of superimposing a document on an image" on the UI unit 18.

Modification 4

Hereinafter, Modification 4 will be described. In Modification 4, a file to which a content is added is changed according to the last saving date (which may be a concept including date/time) of each of plural files selected as objects to be linked. For example, among the plural files, a file of which last saving date is the newest (latest) incorporates a content represented by another file.

For example, as illustrated in FIG. 3, it is assumed that the user selects the document file A associated with the image 26 and the image file C associated with the image 28 as files to be linked. The specifying unit 22 identifies the last saving date of the document file A by referring to last saving date information included in the attribute information of the document file A, and identifies the last saving date of the image file C by referring to last saving date information included in the attribute information of the image file C.

When the last saving date of the document file A is later than the last saving date of the image file C, the specifying unit 22 specifies a linkage function in which a file to which a content is added is a document file (corresponding to a second file) and a content to be added is an image (corresponding to information included in a first file). Such a linkage function is the "function of inserting an image into a document." In this case, the controller 20 displays the information on the "function of inserting an image into a document" on the UI unit 18. In addition, the controller 20 may display the information on the "function of inserting an image into a document" in preference to the information on the other linkage function (e.g., the information on the "function of superimposing a document on an image") on the UI unit 18. When the user gives an instruction to execute the "function of inserting an image into a document," the image represented by the image file C (corresponding to the first file) is inserted into the document represented by the document file A (corresponding to the second file). As a result, a new document file AC may be generated or the document file A may be updated.

Meanwhile, when the last saving date of the image file C is later than the last saving date of the document file A, the specifying unit 22 specifies a linkage function in which a file to which a content is added is an image file (corresponding to a second file) and a content to be added is a document (corresponding to information included in a first file). Such a linkage function is the "function of superimposing a document on an image." In this case, the controller 20 displays the information on the "function of superimposing a document on an image" in preference to the information on the other linkage function (e.g., the information on the "function of inserting an image into a document") on the UI unit 18. When the user gives an instruction to execute the "function of superimposing a document on an image," the document represented by the document file A (corresponding to the first file) is superimposed on the image represented by the image file C (corresponding to the second file). As a result, a new image file CA may be generated or the image file C may be updated.

It is predicted that a file of which last saving date is relatively new (relatively late) is highly likely to be operated and updated by the user in the future, as compared with a file of which last saving date is relatively early. Thus, the file of which last saving date is relatively new incorporates the content of the other file, so that the content of the linkage function easily matches the user's operation intention.

Modification 5

Hereinafter, Modification 5 will be described. In Modification 5, the specifying unit 22 specifies a linkage function corresponding to a method of selecting plural files. For example, the specifying unit 22 may specify a linkage function corresponding to an aspect of the touch of the pointer onto the screen. In this case, in the linkage function management table, a combination of file formats, a selecting method (e.g., a touching aspect), and a linkage function are associated with each other. The specifying unit 22 refers to the linkage function management table and specifies a linkage function associated with a combination of formats of selected files and a selecting method (a touching aspect). For example, a different linkage function is associated with each selecting method.

This process will be described in detail with reference to FIG. 3. For example, when the user performs a tap operation on the images 26 and 28 with the pointer (that is, when the user touches the images 26 and 28 with the pointer on the screen 24 and immediately separates the pointer from the screen 24), the specifying unit 22 specifies a linkage function that is associated with the combination of the document format and the image format and that is associated with the tap operation in the linkage function management table.

In addition, when the user presses the images 26 and 28 with the pointer for a long time (that is, when the user touches the images 26 and 28 with the pointer on the screen 24 and holds the touching state for a predetermined time), the specifying unit 22 specifies a linkage function that is associated with the combination of the document format and the image format and that is associated with the long press operation in the linkage function management table.

In addition, when plural images are selected by the dragging and dropping operation, the specifying unit 22 specifies a linkage function that is associated with the combination of the formats of the plural designated files and that is associated with the dragging and dropping operation.

In addition, when plural files are selected by voice input, the specifying unit 22 specifies a linkage function associated with the combination of the formats of the plural selected files and associated with the voice input method.

According to Modification 5, since a linkage function corresponding to the method of selecting files is specified, information on a different linkage function is displayed according to the selecting method, even though files selected as objects to be linked are the same.

Modification 6

In Modification 6, when an image associated with a file is superimposed on an image associated with another file for a predetermined or longer time, the specifying unit 22 identifies the other file as a file to be linked. In the example illustrated in FIG. 3, when the user moves the image 26 to the image 28 and superimposes the image 26 on the image 28 for the predetermined or longer time, the specifying unit 22 identifies the image file C associated with the image 28 as a file to be linked. When the length of the superimposing time is shorter than the predetermined time, the specifying unit 22 does not identify the image file C associated with the image 28 as a file to be linked.

As another example, when the user selects the image 26, then traces over the screen 24 from the image 26 to the image 28 with the pointer, and selects the image 28 for the predetermined or longer time, the specifying unit 22 may identify the image file C associated with the image 28 as a file to be linked. When the length of the time for which the image 28 is selected is shorter than the predetermined time, the specifying unit 22 does not identify the image file C associated with the image 28 as a file to be linked.

According to Modification 6, when the length of the time for which an image is superimposed or selected is shorter than the predetermined time, the file associated with the image which is the destination of the superimposition or the selected image is not identified as a file to be linked. Thus, a file which is not intended by the user is prevented from being identified as a file to be linked. For example, in a case where the user moves the image 26 or traces over the screen 24 from the image 26 to the image 28, and an image associated with another file is displayed between the images 26 and 28, the image 26 may come into a contact with the image associated with the other file during the movement of the image 26 or the user may trace over the image associated with the other file during the tracing operation. In this case, the other file is identified as a file to be linked. To the contrary, according to Modification 6, when the length of the contacting time or the selecting time during the tracing operation is shorter than the predetermined time, the other file is not identified as a file to be linked, so that the other file is prevented from being identified as a file to be linked against the user's intention.

Modification 7

When a linkage function associated with a combination of formats of files selected by the user is not registered in the linkage function management table, the specifying unit 22 determines that the usable linkage function is not registered. In this case, the controller 20 displays a message indicating that the usable linkage function is not registered, on the UI unit 18. Even in this case, the linkage function may become usable according to, for example, an updating status of software, installation or not of software, and an execution status of a process by software. For example, when new software is installed in the terminal device 10 or when new software provided by, for example, the server becomes usable by the user, a linkage function which is unusable in the past may become usable. In this case, the specifying unit 22 specifies the linkage function that becomes usable.

Modification 8

In Modification 8, the specifying unit 22 specifies a linkage function corresponding to names of plural files (file names) selected as objects to be linked. In the linkage function management table according to Modification 8, a combination of file names and a linkage function are associated with each other. The specifying unit 22 refers to the linkage function management table and specifies a linkage function associated with a combination of names of selected files (file names).

Further, the specifying unit 22 specifies a file to which a content is added, based on a name of a file selected as an object to be linked. For example, when a name of a selected file (file name) includes a character string suggesting a file for integrating data (e.g., a file assumed or predicted to incorporate a content of other data), such as "ledger," "integration," "management," "statistics," "graph," "table," or "list," the specifying unit 22 identifies the file as a file to which a content is added (corresponding to a second file). Further, the specifying unit 22 identifies a file having a file name including no character string for the integration or a file having a file name including a character string suggesting a file for providing content (material), as a file (corresponding to a first file) containing content (material) to be added. For example, a file having a file name including a character string such as "receipt," "slip," "personal data," or "device data" does not correspond to a file for the integration and is determined to correspond to a file for providing a content (material).

For example, in a case where document files A1 and A2 are selected as files to be linked, the document file A1 has a file name including the character string for the integration, and the document file A2 has a file name including the character string for providing a material without including the character string for the integration, the specifying unit 22 specifies a linkage function of, for example, inputting, copying, and performing a statistical process from the document file A2 for providing a material into the document A1 for the integration, as a preferential linkage function. The controller 20 displays the preferential linkage function in preference to other linkage functions on the UI unit 18.

In addition, plural modifications among Modifications 1 to 8 described above may be combined with each other.
(Example of Execution of Linkage Function)

Figure 14:
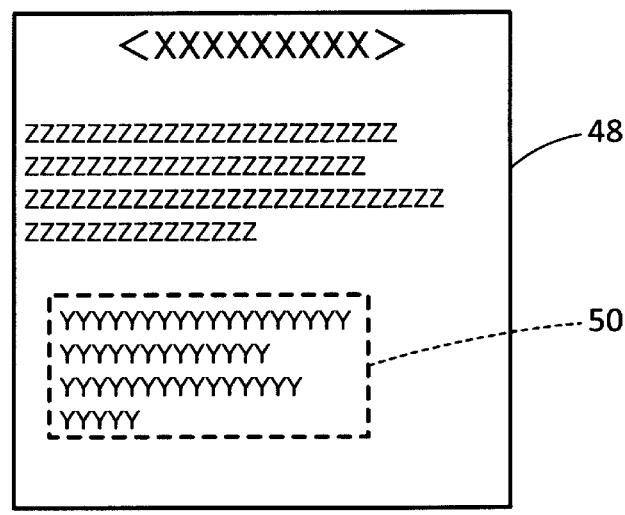
FIG. 14 is a view illustrating an example of a document.

Hereinafter, an example of an execution of a linkage function will be described. FIG. 14 illustrates Execution Example 1. For example, when two document files are selected as files to be linked and the "function of inserting a document into another document" (the function of integrating (combining) documents with each other) is executed, the document application is activated, and a document 48 represented by one document file incorporates a document 50 represented by the other document file. The documents 48 and 50 include, for example, character strings. In addition, the documents 48 and 50 may include, for example, tables, images, or videos. The document 50 is the entire document represented by the other document file or a part of the document represented by the other document file. As a result of the execution of the linkage function, a new document file representing the state where the document 50 is inserted into the document 48 may be generated, or the document 50 is reflected in the document file representing the document 48 so that the document file representing the document 48 may be updated.

Figure 15:
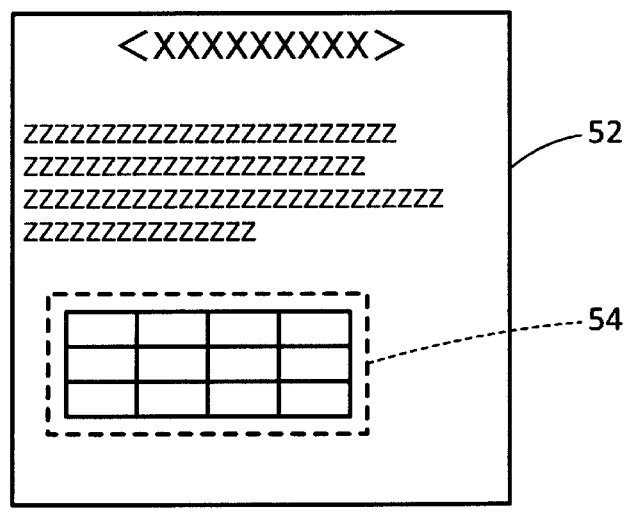
FIG. 15 is a view illustrating an example of a document.

FIG. 15 illustrates Execution Example 2. For example, when a document file and a table file are selected as files to be linked and the "function of inserting a table into a document" is executed, the document application and the spreadsheet application are activated, and a table 54 represented by the table file is inserted into a document 52 represented by the document file. The table 54 is the entire table represented by the table file or a part of the table represented by the table file. In addition, when the table file includes a graph, the graph may be inserted into the document 52. As a result of the execution of the linkage function, a new document file representing the state where the table 54 is inserted into the document 52 may be generated, or the table 54 is inserted into the document file representing the document 52 and the document file may be updated.

Figure 16:
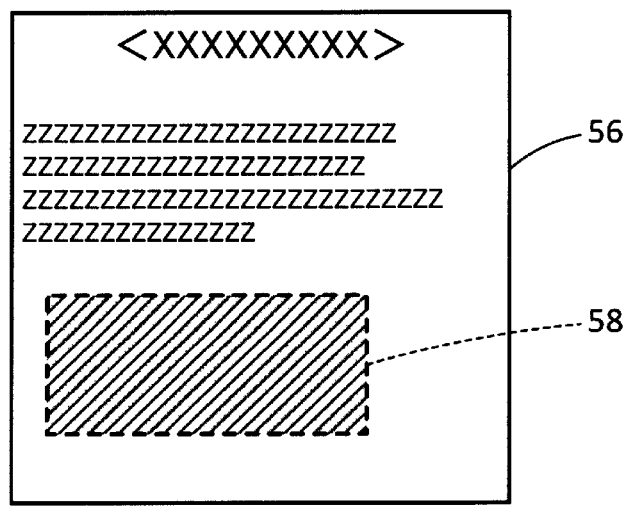
FIG. 16 is a view illustrating an example of a document.

FIG. 16 illustrates Execution Example 3. For example, when a document file and an image file are selected as files to be linked and the "function of inserting an image into a document" is executed, the document application and the image application are activated, and an image 58 represented by the image file is inserted into a document 56 represented by the document file. The image 58 is the entire image represented by the image file or a part of the image represented by the image file. As a result of the execution of the linkage function, a new document file representing the state where the image 58 is inserted into the document 56 may be generated, or the image 58 is inserted into the document file representing the document 56 and the document file may be updated.

Figure 17:
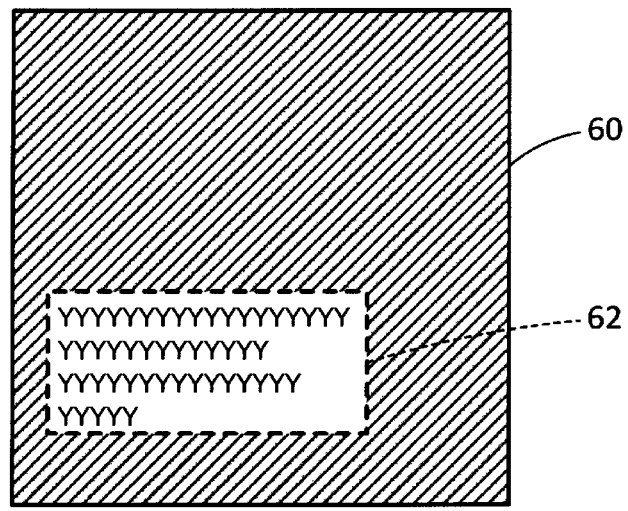
FIG. 17 is a view illustrating an example of an image.

FIG. 17 illustrates Execution Example 4. For example, when a document file and an image file are selected as files to be linked and the "function of superimposing a document on an image" is executed, the document application and the image application are activated, and a document 62 represented by the document file is superimposed on an image 60 represented by the image file. At this time, the image 60 itself is not processed, and the document 62 is superimposed on the image 60. For example, when the document 62 on the image 60 is deleted, the original image 60 is obtained. In addition, when the image 60 itself may be processed, the document 62 may be embedded in the image 60. The document 62 is the entire document represented by the document file or a part of the document represented by the document file. As a result of the execution of the linkage function, a new image file representing the state where the document 62 is superimposed on the image 60 may be generated, or the document 62 is superimposed on the image file representing the image 60 and the image file may be updated.

Figure 18:
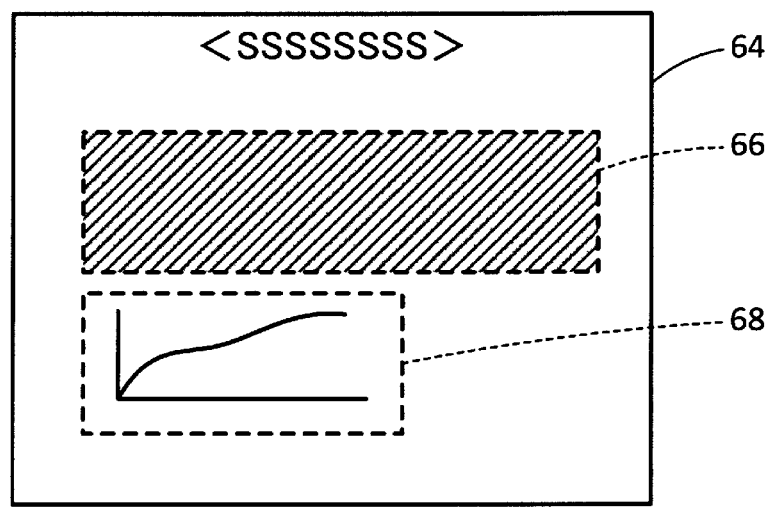
FIG. 18 is a view illustrating an example of a document.

FIG. 18 illustrates Execution Example 5. In the execution examples described above, two files are selected as files to be linked. However, three or more files may be selected as files to be linked. In this case, a linkage function associated with the three or more files is executed. In Execution Example 5, for example, a document file, an image file, and a table file are selected as files to be linked, and a "function of inserting an image and a table into a document" is executed. In this case, the document application, the spreadsheet application, and the image application are activated, and an image 66 represented by the image file and a graph 68 represented by the table file are inserted into a document 64 represented by the document file. The image 66 is the entire image represented by the image file or a part of the image represented by the image file. The graph 68 is the entire graph represented by the table file or a part of the graph represented by the table file. In addition, when the table file includes a table, the table may be inserted into the document 64. In a case where four or more files are selected as files to be linked as well, the same process as described above is executed.

As an execution example other than the execution examples described above, when a document file and a video file are designated as files to be linked, a video represented by the video file may be inserted into a document represented by the document file. When the document file is a file into which a video cannot be inserted, one or plural frames (still images) in the video may be inserted into the document.

In addition, when a document file and a music file are designated as files to be linked, music represented by the music file may be inserted into a document represented by the document file. When the document file is a file into which music cannot be inserted, a character string such as a title of the music may be inserted into the document.

In addition, when a video file and a music file are designated as files to be linked, music represented by the music file may be inserted into a video represented by the video file.

In addition, in the execution examples described above, a position in a content (e.g., a document, table, image, video or music) where another content is inserted may be designated by the user or may be determined in advance. The position may be changed by the user after the insertion of the content. An editing function which is executable for the inserted content depends on the function of software used.

The exemplary embodiments and modification described above may also be applied when an automatic execution process by the robotics process automation (RPA) is set. For example, when formats of plural files designated by a setting person, a combination of the plural file formats, and a linkage function associated with the combination are stored as setting contents, and a process is executed according to the setting contents. Examples of the RPA include a routine process such as data input or a job executable by a combination of plural pieces of application software, a process such as data collection or analysis, and a process of conducting learning and making a decision based on data.

The terminal device 10 is implemented by, for example, a cooperation of hardware and software. Specifically, the terminal device 10 includes one processor or plural processors such as a CPU (not illustrated). The function of each unit of the terminal device 10 is implemented in the manner that one or plural processors read and execute a program stored in a storage device (not illustrated). The program is stored in the storage device via a recording medium such as a CD or a DVD, or a communication path such as a network. As another example, each unit of the terminal device 10 may be implemented by, for example, a hardware resource such as a processor, an electronic circuit or an application specific integrated circuit (ASIC). For the implementation, a device such as a memory may be used. As yet another example, each unit of the terminal device 10 may be implemented by, for example, a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a controller that controls a notification of executing a linkage function implemented by linking a plurality of selected files having different file formats comprising a document file, an image file, a video file, a spreadsheet file, a presentation file, a graphic file, and an audio file respectively associated with a plurality of applications, wherein the controller comprises a specifying unit, and the specifying unit determines a master-servant relationship between the selected files based on the file formats or editabilities thereof for determining priorities of executing the linkage function, wherein the selected files are determined as master files when contents of the selected files are editable, and the selected files are determined as servant files when contents of the selected files are not editable.

2. The information processing device according to claim 1, wherein when the plurality of files having different formats are selected, the controller controls the notification of the linkage function corresponding to the formats of the selected files.

3. The information processing device according to claim 1, wherein when the plurality of files having a same format are selected, the controller controls the notification of the linkage function corresponding to the format of the selected files.

4. The information processing device according to claim 1, wherein the controller controls the notification of the linkage function corresponding to names of the selected files.

5. The information processing device according to claim 1, wherein the linkage function is a function executable by using software associated with the respective files.

6. The information processing device according to claim 1, wherein the linkage function is a function which is to be executed on the selected files.

7. The information processing device according to claim 6, wherein the linkage function is a function of adding information included in a first file among the plurality of selected files to a second file.

8. The information processing device according to claim 7, wherein according to formats of the selected files, the selected files are used as the first file or the second file.

9. The information processing device according to claim 7, wherein according to last saving dates of the selected files, the selected files are used as the first file or the second file.

10. The information processing device according to claim 7, wherein according to names of the selected files, the selected files are used as the first file or the second file.

11. The information processing device according to claim 7, wherein the controller executes the linkage function on the first and second files to generate a third file as a result of the execution without editing the first and second files.

12. The information processing device according to claim 1, wherein the controller controls the notification of the linkage function corresponding to a method of selecting the plurality of files.

13. The information processing device according to claim 1, wherein the controller comprises a specifying unit, and the specifying unit specifies the linkage function associated with a combination of the file formats.

14. An information processing method comprising:
controlling a notification of executing a linkage function implemented by linking a plurality of selected files having different file formats comprising a document file, an image file, a video file, a spreadsheet file, a presentation file, a graphic file, and an audio file respectively associated with a plurality of applications, wherein the controller comprises a specifying unit, and the specifying unit determines a master-servant relationship between the selected files based on the file formats or editabilities thereof for determining priorities of executing the linkage function, wherein the selected files are determined as master files when contents of the selected files are editable, and the selected files are determined as servant files when contents of the selected files are not editable.

15. A non-transitory computer readable medium storing a program causing a computer to execute information processing, the information processing comprising:
controlling a notification of executing a linkage function implemented by linking a plurality of selected files having different file formats comprising a document file, an image file, a video file, a spreadsheet file, a presentation file, a graphic file, and an audio file respectively associated with a plurality of applications, wherein the controller comprises a specifying unit, and the specifying unit determines a master-servant relationship between the selected files based on the file formats or editabilities thereof for determining priorities of executing the linkage function, wherein the selected files are determined as master files when contents of the selected files are editable, and the selected files are determined as servant files when contents of the selected files are not editable.

* * * * *